United States Patent

Reichart et al.

[11] Patent Number: 5,911,771
[45] Date of Patent: Jun. 15, 1999

[54] GEAR SHIFT CONTROL FOR AUTOMATIC TRANSMISSIONS IN MOTOR VEHICLES HAVING AN ELECTRONIC CONTROL UNIT

[75] Inventors: Guenter Reichart, Kirchheim; Hans-Hermann Braess, Gruenwald, both of Germany

[73] Assignee: Bayerische Motoren Werke Aktiengesellschaft, Munich, Germany

[21] Appl. No.: 08/723,120

[22] Filed: Sep. 30, 1996

[30] Foreign Application Priority Data

Sep. 29, 1995 [DE] Germany .......................... 195 36 512

[51] Int. Cl.⁶ .................................................. F16H 61/02
[52] U.S. Cl. .............................................. 701/65; 477/97
[58] Field of Search ........................ 477/97; 364/424.094; 701/65, 87, 95, 117

[56] References Cited

U.S. PATENT DOCUMENTS

| | | | |
|---|---|---|---|
| 4,584,906 | 4/1986 | Nagaoka et al. | 477/97 |
| 4,943,921 | 7/1990 | Baltusis et al. | 477/97 |
| 5,184,527 | 2/1993 | Nakamura | 477/97 |
| 5,218,541 | 6/1993 | Sakaibara et al. | 477/97 |
| 5,369,591 | 11/1994 | Broxmeyer | 701/117 |
| 5,420,794 | 5/1995 | James | 701/117 |
| 5,428,531 | 6/1995 | Hayafune | 477/97 |
| 5,485,381 | 1/1996 | Heintz et al. . | |
| 5,598,335 | 1/1997 | You | 477/97 |
| 5,716,301 | 2/1998 | Wild et al. | 701/87 |

FOREIGN PATENT DOCUMENTS

| | | |
|---|---|---|
| 42 05 979 | 9/1993 | Germany . |
| 43 37 163 | 5/1994 | Germany . |

OTHER PUBLICATIONS

Japanese Abstract No. 06–187595, vol. 018, No. 539.
German aricle entitled "Die Adaptive Getriebesteuerung für die Automatikgetriebe der BMW Fahrzeuge mit Zwölfzylindermotor" by Von Andreas Welter et al., pp. 428–430, 432, 434–436, *ATZ Automobiltechnische Zeitschrift 94* (1992).
German article entitled "Die Adaptive Getriebesteuerung für BMW–Automobile" by Von Andreas Welter et al., pp. 420, 421, 423, 424, 426, 431, 432–434, *ATZ Automobiltechnische Zeitschrift 95* (1993).

*Primary Examiner*—Dirk Wright
*Attorney, Agent, or Firm*—Evenson, Mckeown, Edwards & Lenahan, P.L.L.C.

[57] ABSTRACT

In the case of a gear shift control for automatic transmissions in motor vehicles having an electronic control unit which determines the gear change as a function of operating parameters of the vehicle, the electronic control unit controls the gear changes also as a function of input signals which are obtained from information generated outside the vehicle and which indicate environmental conditions of the vehicle.

23 Claims, 1 Drawing Sheet

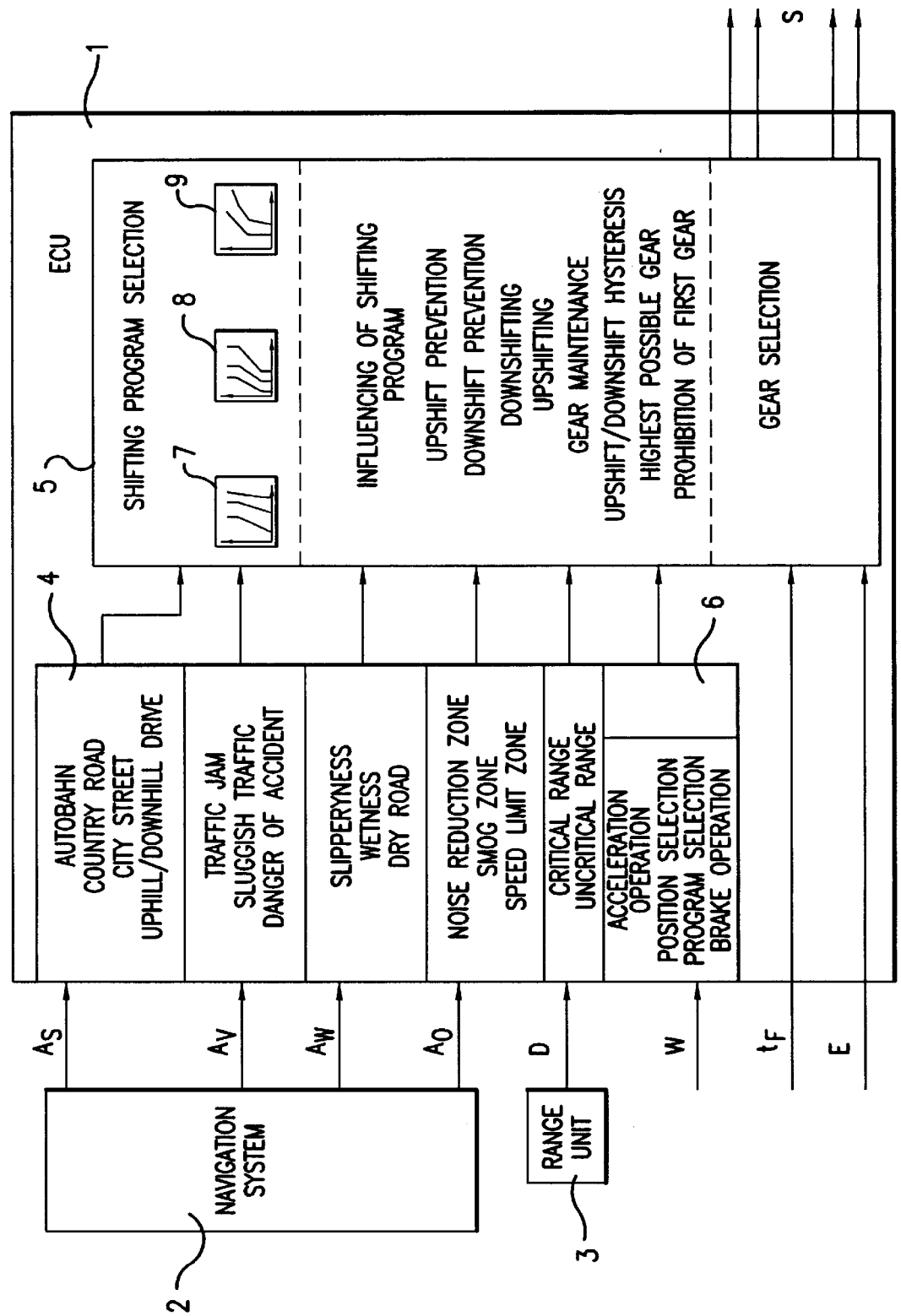

GEAR SHIFT CONTROL FOR AUTOMATIC TRANSMISSIONS IN MOTOR VEHICLES HAVING AN ELECTRONIC CONTROL UNIT

BACKGROUND AND SUMMARY OF THE INVENTION

This invention relates to a gear shift control for automatic transmissions in motor vehicles having an electronic control unit and, more particularly, to a gear shift control for automatic transmissions in motor vehicles having an electronic control unit which determines the gear change as a function of operating parameters of the vehicle.

A known gear shift control is described, for example, in the ATZ article "The Adaptive Transmission Control for the Automatic Transmission of BMW Vehicles with a 12-Cylinder Engine", September 1992, Page 428+. For the gear shift control, the electronic control unit receives as input signals a plurality of operating parameters of the vehicle, such as the throttle valve angle, the driving speed, the rotational wheel speeds, the engine drive torque, the longitudinal acceleration as well as the lateral acceleration of the vehicle, the rotational engine speed and the rotational output speed. The adaptive transmission control carries out a driver-adapted and situation-adapted gear shift control also by means of the so-called "driver type recognition", "environment recognition" and "driving situation recognition". By means of the "driver type recognition", it is determined as a function of operating parameters which reflect the driver's intention whether a more economical or a sportier driving method is desired. By means of the function blocks "environment recognition" and "driving situation recognition", environmental conditions of the vehicle are determined as a function of operating parameters of the vehicle which exist indirectly with a high probability, such as a slippery road, uphill or downhill driving, cornering or a stop-and-go operation. For the gear shift control, different shifting programs in the form of characteristic upshift and downshift curves are available which are activated, for example, as a function of the "driver type recognition" or of the "environment recognition". The gear shift control is basically carried out corresponding to the respective selected shifting program. However, for example, as a function of the result of the so-called "driving situation recognition", it can be changed by additional functions, such as an upshift suppression, a downshift suppression or an immediate triggering of a downshifting.

However, this known gear shift control achieves a situation-adapted driving method only for a short time for a driving situation which has already occurred and which is determined by operating parameters of the vehicle in each case only for the momentary point in time. In the event of frequently changing operating parameters of the vehicle, an unintentional increase of the shifting frequency and, therefore, a reduction of the comfort, may occur as the result of this momentary adaption. Also, an environmental condition (for example, stop-and-go traffic) determined indirectly by operating parameters does not actually exist with absolute certainty or exists only for a very short period of time.

There is therefore needed an improved gear shift control of the above-mentioned type such that an optimization of the comfort is achieved, particularly by the reduction of the shifting frequency, by a better assignment of an intervention and by the actual driving situation conditions. Hence, a reduction of the necessary driver interventions is achieved. Furthermore, preferably the fuel consumption is to be reduced and the driving safety is to be increased.

These needs are met according to the present invention by a gear shift control for automatic transmissions in motor vehicles, having an electronic control unit which determines the gear change as a function of operating parameters of the vehicle. The electronic control unit controls the gear changes also as a function of input signals which are obtained from information generated outside the vehicle and reflect the environmental conditions of the vehicle.

According to the invention, the electronic control unit controls the gear shifting also as a function of input signals which are received from information developed outside the vehicle and reflect the environmental conditions of the vehicle.

Information concerning environmental conditions of the vehicle developed outside the vehicle are provided, for example, by satellite networks (GPS), radio data systems (RDS, European Radio Data System) mobile radio units, electronic traffic signs and/or maps with street and location markings digitally stored for vehicle navigation systems. In addition, it is conceivable to detect corresponding information also by means of optical sensors and to make them available in the vehicle by means of image processing. All information can, for example, be received by a central unit, such as a navigation system, existing in the vehicle and can be transmitted to the electronic control unit. However, it is also possible to construct the electronic control unit such that it can itself receive and process the information.

This information, which is available independently of the vehicle, and concerns the environmental conditions within which the vehicle is moving, permits a longer-term recognition of the driving situation which is independent of very rapidly changing operating parameters of the vehicle, and therefore a more stable gear shift control. In the following, this operation will be explained by an example:

When an electronic traffic sign provides the information that a downhill drive from a pass follows which has a length of 30 km, a corresponding conclusion can be drawn with respect to a fairly long-lasting environmental condition "downhill drive" for the indicated distance, in the case of which short sections without any slope are ignored. If, according to the prior art, the downhill drive were detected via the operating parameters of the vehicle, particularly by a gradient indicator or by the comparison of the vehicle acceleration and the throttle valve angle, the end of the downhill drive would, in each case, be recognized on the short section without any slope. Then, a corresponding change of the gear shift control strategy would normally result in an upshifting. In the section which follows and which is sloped again, a downhill drive would again be recognized. Correspondingly, the gear shift control strategy will be changed again and, for example, a downshifting is caused. Therefore, in the case of a "downhill drive" recognition as a function of the operating parameters of the vehicle, a pendulum shifting is possible which reduces the comfort in the vehicle.

Preferably, the input signals also reflect environmental conditions to be expected in the future.

The optimal gear relative to a newly occurring situation is therefore not engaged in a delayed manner, but rather the driving method can already be adapted with, or before, the occurrence of a driving situation or environmental condition to be expected. In addition, by anticipating the indication of the environmental conditions of the vehicle to be expected, it can be recognized whether a frequent change of driving situations exists with constantly recurring environmental conditions. In this case, it can be determined by statistical analysis which environmental conditions are to be expected most frequently, and then the method of operation adapted to this environmental condition can be maintained also in the case of short-term changes of the environmental condition.

Accordingly, by using the gear shift control according to the invention, the shifting frequency is reduced and the driving method is adapted early and/or in an anticipating manner to a longer-lasting driving situation.

It is an advantage of the invention that an input signal reflects the type of the road on which the vehicle is situated. Adapted to the type of road, the gear shift control can take measures for reducing the shifting frequency, for example, in the case of a multiple-curve country road; or measures for reducing the exhaust gas emissions, for example, in city driving. As the result of the type of road, a plurality of driving situations can be recognized in an anticipating manner, such as downhill driving, uphill driving, cornering and straight-ahead driving. The type of road is available as information via the stored map in the case of navigation systems for motor vehicles or by means of electronic traffic signs. The type of road can be indicated by its category (for example, autobahn, country road, city street); by its cornering profiles, slope profiles and gradient profiles; or by its road condition (for example, track grooves, gravel, tar).

According to a further advantage of the invention, an input signal reflects the traffic situation at least on the road on which the vehicle is situated. Information concerning the traffic situation is available, for example, by means of the known radio data systems (RDS). As a function of the traffic situation, the shifting frequency can be reduced, for example, for increasing the comfort in the case of a sluggish traffic, or the driving safety can be increased, for example, by means of a downshifting, for reducing the driving speed in the event of an accident danger.

According to a still further advantage of the invention, an input signal reflects the weather situation in the close vicinity of the road on which the vehicle is situated. Information concerning the weather situation is also available from the radio data system RDS. As a result of the information regarding the weather situation, the driving method can be adapted via the gear shift control, particularly for increasing the driving safety. For example, in the case of a slippery road, preferably higher gears can be permitted and/or the lowest gears can be prohibited. As a result of the information of the weather situation as an input signal for the electronic control unit, particularly the directional control of the vehicle can therefore be increased.

According to yet another advantage of the invention, an input signal indicates a location marking in the close vicinity of the road on which the vehicle is situated. Such information is provided by the maps stored in navigation systems or also by the known radio data systems RDS.

When it is recognized that the vehicle is situated, for example, in a zone endangered by smog, for minimizing the exhaust gas emissions, the gear shift control can take place corresponding to the shifting program by which the lowest fuel consumption is achieved. Thus, by using the gear shift control according to the invention, the driving method can also be adapted to environmental protection requirements.

Other objects, advantages and novel features of the present invention will become apparent from the following detailed description of the invention when considered in conjunction with the accompanying drawings.

BRIEF DESCRIPTION OF THE DRAWING

The single drawing illustrates an embodiment of the invention showing an electronic control unit for carrying out the gear shift control according to the invention which is connected to a navigation system and to a ranging system, among other systems.

DETAILED DESCRIPTION OF THE DRAWING

An electronic control unit 1 for controlling the gear shift control of automatic transmissions in motor vehicles receives four input signals from a navigation system 2 installed in the vehicle. The navigation system 2 preferably also receives information from a radio data system (RDS). The four input signals include: the type of road $A_S$, the traffic situation $A_V$, the weather situation $A_W$, and a special location marking $A_O$. Furthermore, from additional control units and/or sensors (not shown here), different parameters of the vehicle are transmitted as input signals to the control unit 1. The parameter values are determined by the driver's operating activities In the illustrated embodiment, the input signals are combined as driver's intention signals W. Furthermore, a range signal D leads from a ranging unit 3 to an input of the control unit 1. In the illustrated example, a drive duration signal $t_F$ is also transmitted to the control unit 1 which is generated, for example, by a vehicle computer or also by the navigation system 2 as a function of the fed target location. Furthermore, different additional input signals E lead to the control unit 1 and reflect the operating parameters of the vehicle or of the internal-combustion engine which are normal for known gear shift controls. Such input signals E may be the throttle valve opening angle, the vehicle speed, the rotational speed of the internal-combustion engine, the drive torque, a slip value of the drive wheels, the longitudinal or lateral acceleration, and the rotational output speed.

In the case of previously known electronically controlled automatic transmissions, driver's intention signals W, such as the accelerator operation or the operation of the throttle valve, the position selection by the transmission selector lever, the program selection (for example, sporty "S", economical "E" or manual "M") and the brake operation are also used for the gear shift control. Concerning the method of operation of conventional gear shift controls, reference is made in the manner of an example to the above-mentioned ATZ article for the adaptive transmission control.

The input signal $A_S$ for determining the type of road transmitted by the navigation system 2 may contain the following information: Autobahn (expressway/interstate highway), country road, city street or uphill-downhill drive. The input signal $A_V$ for determining the traffic situation contains information, such as traffic jam, sluggish traffic or accident danger. The input signal $A_W$ for determining the weather situation informs about slipperiness, wetness and a dry road. The input signal $A_O$ contains, for example, the information concerning a reduced-noise zone, a smog zone or a speed-limit zone.

In particular, the input signals $A_V$, $A_W$ and $A_O$ are made available to the electronic control unit 1 by known radio data systems (RDS) or by electric traffic signs whose information is preferably first received and analyzed by the navigation system 2. The input signal $A_S$ is preferably obtained from the stored maps of the navigation system 2 and/or from electronic traffic signs which communicate with the navigation system 2. The four input signals $A_S$, $A_V$, $A_W$ and $A_O$ transmitted from the navigation system 2 to the control unit 1 reflect the environmental conditions near the vehicle for a momentary point in time, as well as in an anticipating manner for a future point in time.

The range signal D from the ranging unit 3 may, for example, contain the information of whether, relative to a vehicle driving ahead, a critical or uncritical distance or a high differential speed exists if the momentary vehicle speed is maintained. The drive duration signal $t_F$ can be calculated by the navigation system 2 after the desired target destination location is input.

The input signals of the control unit 1—$A_S$, $A_V$, $A_W$, $A_O$, D and W—first lead to a selection unit 4. As a function of the information of the input signals which are transmitted by the navigation system 2, the momentary environmental condition of the vehicle and/or the environmental condition of the vehicle which is to be expected is determined in the selection unit 4. Then the respective determined environmental condition is transmitted to an analysis unit 5.

The driver's intention signals, such as the accelerator operation, the position selection, the program selection and the brake operation, are first transmitted to a driver type recognition unit 6. The recognized driver type is also transmitted as an input signal to the analysis unit 5. Likewise, the analysis unit 5 receives as an input signal the information "critical range" or "uncritical range" which is reported by the range signal D. Also the drive duration signal $t_F$ and all other input signals E lead to the analysis unit 5. As a function of its input signals, the analysis unit 5 determines the respective optimal gear to be engaged. This gear will then be engaged by means of the control signals S fed to the hydraulic unit of the automatic transmission.

Various shifting programs are provided for a selection in the analysis unit 5. For example, a sporty shifting program, 7 an economical shifting program 8 and a winter shifting program 9 are made available. After the selection of a corresponding shifting program, this shifting program can also be influenced or changed by various logic circuits of the analysis unit 5. As a function of the input signals of the analysis unit 5, for example, an upshift prevention, a downshift prevention, an immediate downshifting, an immediate upshifting, a gear maintenance, a change of the upshift/downshift hysteresis, the engaging of the highest possible gear or a prohibition of the first gear can be carried out. After the selection of the shifting program and its influencing, the optimal gear to be engaged will then be determined.

Examples will be listed in the following for explaining the gear change control according to the invention, particularly in connection with the possible input signals for the indication of vehicle-independent environmental conditions.

When the vehicle is on the autobahn or highway, as the reported type of road, the analysis unit 5 will preferably control the gear change such that a minimizing of the shifting frequency is achieved and higher gears are preferably engaged. For this purpose, for example, the economical shifting program 8 can be selected, and can be influenced such that downshifts are prevented sooner. In contrast to the sporty shifting program 7, the economical shifting program 8 already shifts at lower vehicle speeds to a respective higher gear. In contrast, when the vehicle is on a country road, the analysis unit 5 can conclude that there will be frequent cornering, whereby, preferably also as a function of additional input signals of the analysis unit 5, upshift preventions take place. On city streets, particularly in connection with a stop-and-go operation, the first gear is prohibited in order to prevent a frequent change between upshifts and downshifts. Particularly in city traffic, the second gear will be sufficient for an appropriate starting acceleration because normally only a low driving output is required in city streets. By contrast, when the vehicle is on an uphill-downhill drive, a gear shift control can be carried out by the analysis unit 5 which preferably selects low gears, for example, by means of an upshift prevention, and active downshifting or a gear maintenance.

When the analysis unit 5 is informed of the traffic situation of a traffic jam, corresponding to the stop-and-go operation, the first gear can be prohibited for reducing the shifting frequency. When there is sluggish traffic, gear shifts can take place in a delayed manner by changing the upshift/downshift hysteresis in order to also reduce the shifting frequency. If an accident danger is reported, an active downshifting can take place, preferably with a simultaneous acoustic warning, for the immediate reduction of the vehicle speed.

When there is a danger of slippery conditions because of the weather situation, the winter shifting program 9 can automatically be selected for increasing the vehicle stability, by means of which winter shifting program 9, even at very low vehicle speeds, higher gears are engaged in comparison to other shifting programs and, in addition, the first gear is prohibited. When there is a danger of wetness, the selection of higher gears is possible as a reaction. When the road is dry, the gear shift control is at least not influenced in that a reduction of the output torque takes place, for example, by an active upshifting or a downshift prevention.

When the vehicle is in a low-noise zone as the location marking, a gear shift control preferably takes place which reduces the shifting frequency and possibly, by means of a suppression of downshifts, prevents a revving of the internal-combustion engine. If the location marking contains the information that the vehicle is in a smog zone, the gear change control is preferably carried out such that a minimizing of the fuel consumption is achieved. For this purpose, for example, the economical shifting program is selected and, additionally, is influenced corresponding to an exhaust gas minimizing. In a reduced-speed zone, at an excessive speed, a speed reduction can be initiated by means of an upshift prevention or by an active downshifting, preferably in connection with a visual or acoustic warning signal.

Furthermore, in the case of a critical range which is reported by the range signal D, an upshift prevention or an active downshifting for a speed reduction can also be carried out. Also, as a function of the drive duration signal $t_F$, the gear shift control can be influenced correspondingly by the analysis unit 5. The drive duration signal $t_F$ is linked, for example, with the information of the distance range as a function of the fuel tank content. If the momentary distance range is below the predetermined driving duration, the gear shift control can be carried out corresponding to a minimizing of the fuel consumption. If, however, the driving duration is below the distance range, for example, the selection of the sporty shifting program 7 is permitted without any limitation.

Particularly by using the input signals which are present in the control unit 1 as a result of the navigation system 2, it is possible to determine not only the momentary driving situation but, in an anticipating manner, also environmental conditions and driving situations that are to be expected over a longer time period. The driving method can also be adapted to the above by using the gear shift control.

Accordingly, for example, no change of the gear shift control takes place when, as a result of the recognized environmental condition (for example, country road or slippery condition) a driving situation (for example, cornering, or wheel slip slope) is to be expected which remains the same over an extended period and which is only briefly interrupted (for example, short straight sections in the case of a country road with multiple curves or short dry road sections while the road is otherwise slippery).

Via the gear shift control according to the present invention, therefore, comfort is increased, fuel consumption is reduced, driving safety is raised and the necessary driver's interventions are decreased for the momentary point in time, as well as in an anticipating manner for future points in time.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A gear shift control for an automatic transmission in a motor vehicle, comprising:

an electronic control unit which determines gear changes as a function of operating parameters of the vehicle, wherein said electronic control unit directly controls the gear changes also as a function of input signals obtained from information which reflects environmental conditions with respect to the vehicle, which information is generated outside of the vehicle.

2. The gear shift control according to claim 1, wherein one of the input signals indicates a type of road on which the vehicle is situated.

3. The gear shift control according to claim 1, wherein one of the input signals indicates a weather situation in a close vicinity on a road on which the vehicle is situated.

4. The gear shift control according to claim 2, wherein one of the input signals indicates a weather situation in a close vicinity on a road on which the vehicle is situated.

5. The gear shift control according to claim 1, wherein said information reflects environmental conditions to be expected at a future time.

6. The gear shift control according to claim 1, wherein said information generated outside of the vehicle is generated by a satellite network.

7. The gear shift control according to claim 1, wherein said information generated outside of the vehicle is generated by a radio data system.

8. The gear shift control according to claim 1, wherein said information generated outside of the vehicle is generated by a mobile radio unit.

9. The gear shift control according to claim 1, wherein said information generated outside of the vehicle is generated by an electronic traffic sign.

10. The gear shift control according to claim 1, wherein said information generated outside of the vehicle is generated by a vehicle navigation map, said map being stored in a vehicle navigation system on board the vehicle.

11. A gear shift control for an automatic transmission in a motor vehicle, comprising:

an electronic control unit which determines gear changes as a function of operating parameters of the vehicle, wherein said electronic control unit directly controls the gear changes also as a function of input signals obtained from information which reflects environmental conditions with respect to the vehicle, which information is generated outside of the vehicle; and wherein one of the input signals indicates a traffic situation at least on a road on which the vehicle is situated.

12. The gear shift control according to claim 11, wherein one of the input signals indicates a weather situation in a close vicinity on a road on which the vehicle is situated.

13. The gear shift control according to claim 11, wherein one of the input signals indicates a location marking in a close vicinity of a road on which the vehicle is situated.

14. The gear shift control according to claim 12, wherein one of the input signals indicates a location marking in a close vicinity of a road on which the vehicle is situated.

15. A gear shift control for an automatic transmission in a motor vehicle, comprising:

an electronic control unit which determines gear changes as a function of operating parameters of the vehicle, wherein said electronic control unit directly controls the gear changes also as a function of input signals obtained from information which reflects environmental conditions with respect to the vehicle, which information is generated outside of the vehicle;

wherein one of the input signals indicates a type of road on which the vehicle is situated; and wherein one of the input signals indicates a traffic situation at least on a road on which the vehicle is situated.

16. The gear shift control according to claim 15, wherein one of the input signals indicates a weather situation in a close vicinity on a road on which the vehicle is situated.

17. The gear shift control according to claim 15 wherein one of the input signals indicates a location marking in a close vicinity of a road on which the vehicle is situated.

18. The gear shift control according to claim 16, wherein one of the input signals indicates a location marking in a close vicinity of a road on which the vehicle is situated.

19. A gear shift control for an automatic transmission in a motor vehicle, comprising:

an electronic control unit which determines gear changes as a function of operating parameters of the vehicle, wherein said electronic control unit directly controls the gear changes also as a function of input signals obtained from information which reflects environmental conditions with respect to the vehicle, which information is generated outside of the vehicle; and wherein one of the input signals indicates a location marking in a close vicinity of a road on which the vehicle is situated.

20. The gear shift control according to claim 19, wherein one of the input signals indicates a type of road on which the vehicle is situated.

21. The gear shift control according to claim 20, wherein one of the input signals indicates a weather situation in a close vicinity on a road on which the vehicle is situated.

22. A gear shift control for an automatic transmission in a motor vehicle, comprising:

an electronic control unit which determines gear changes as a function of operating parameters of the vehicle, wherein said electronic control unit directly controls the gear changes also as a function of input signals obtained from information which reflects environmental conditions with respect to the vehicle, which information is generated outside of the vehicle;

wherein one of the input signals indicates a weather situation in a close vicinity on a road on which the vehicle is situated; and wherein one of the input signals indicates a location marking in a close vicinity of a road on which the vehicle is situated.

23. A method of controlling gear changes for an automatic transmission in a motor vehicle, the method comprising the steps of:

inputting operating parameters of the vehicle to an electronic control unit;

inputting to the electronic control unit input signals obtained from information reflecting environmental conditions with respect to the vehicle, said information being generated outside of the vehicle; and controlling gear changes for the automatic transmission in the motor vehicle with the electronic control unit as a function of the operating parameters of the vehicle and also the input signals obtained from information reflecting the environmental conditions with respect to the vehicle.

* * * * *